Nov. 12, 1968  F. F. BROCKMÜLLER  3,410,423
STACKING DEVICE FOR HOSE DRAWING MACHINES
Filed June 28, 1965
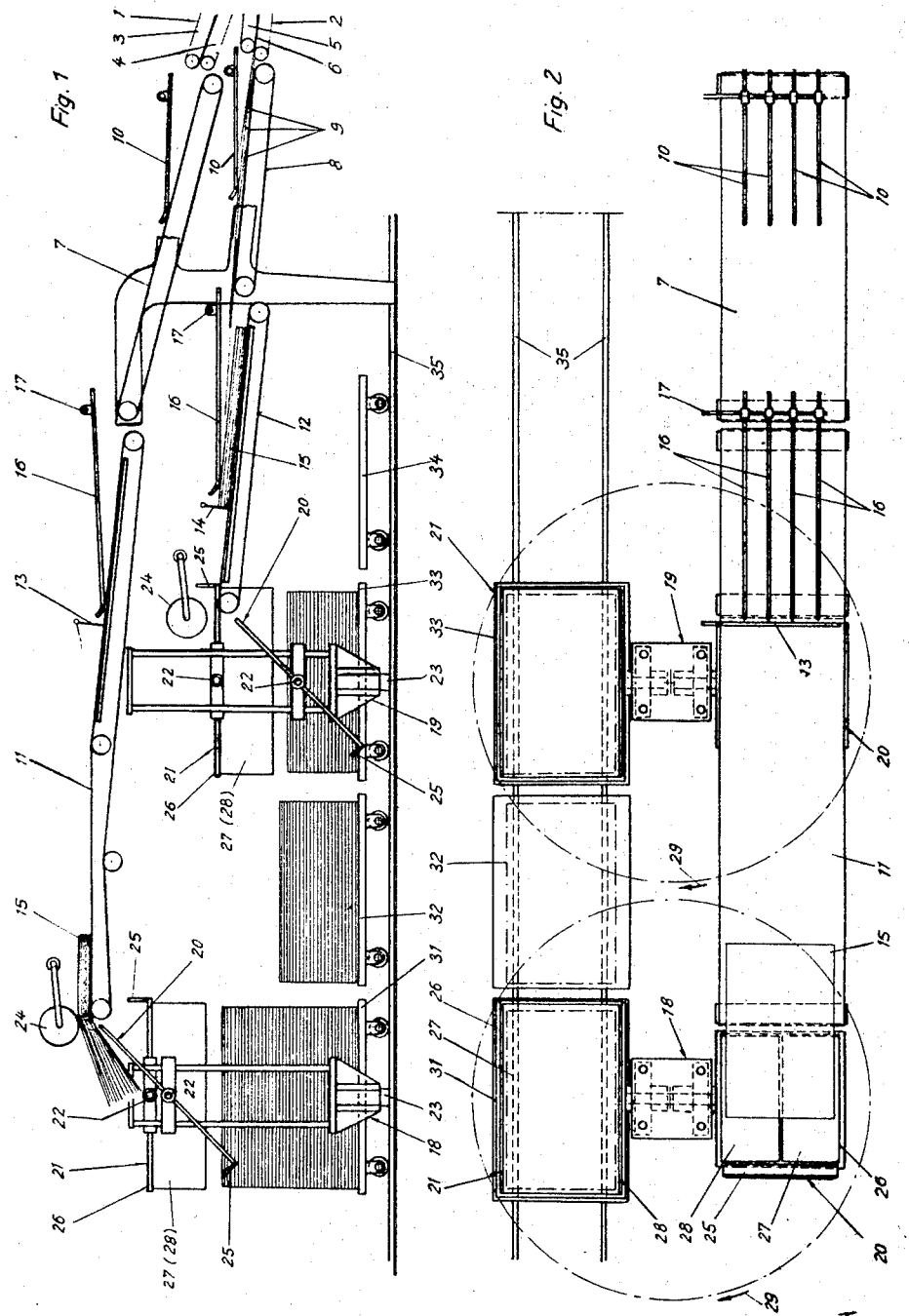
Inventor
Friedrich Franz Brockmüller
Stevens, Davis, Miller & Mosher
Attorney

United States Patent Office 3,410,423
Patented Nov. 12, 1968

3,410,423
STACKING DEVICE FOR HOSE
DRAWING MACHINES
Friedrich Franz Brockmüller, Lengerich, Germany, assignor to Windmöller & Hölscher, Lengerich, Germany
Filed June 28, 1965, Ser. No. 467,260
Claims priority, application Germany, July 4, 1964,
W 37,112
5 Claims. (Cl. 214—6)

ABSTRACT OF THE DISCLOSURE

An apparatus for automatically forming and depositing loose batches of tube sections such as those produced by a tube-forming machine including at least two first belt conveyors alternately receiving the tube sections, a second conveyor belt following each first conveyor belt and running at a slower speed than the normal feeding speed of the first conveyors, and a third conveyor belt following each of the second conveyor belts. A stop plate is associated with each of the third conveyor belts for collecting the tube sections thereon in loose batches. A depositing table inclined downwardly away from the delivery end of each of the third belt conveyors receives the collected batches of tube sections and a second stop plate at the back end of the table collects the batches thereon in such a way as to remove the slightest tube section irregularities.

---

In hose drawing machines for manufacturing single-layer or multiple-layer hose sections of paper or other materials, which are used as basic material for producing bags, devices for automatic formation and stacking of loose parcels, composed of a certain number of hose sections, at the end of the hose drawing machine are already known. The hose sections which have been combined to form a loose parcel are placed on a conveyance which transports the parcel to a bottom placing machine or to a temporary storage area from where the parcels are transported to the bottom placing machine later on, as required.

A known device of this type comprises one or several swivel-mounted stacking stages which are inclined backwards in the take-over position and on which the parcels are formed, in addition to conveyor belts for transporting the hose sections to the stacking stages. When a certain number of hose sections has been fed onto the stage, the respective stacking stage is tilted forward whereby the parcel is transferred to the conveyance. In another, also known device, the loose parcels are formed by a certain number of hose sections on collective conveyor belts, whereby the hose sections run up against a stop ridge which is tilted upwards when the desired parcel thickness has been reached, whereupon the parcel thus formed is transported by the respective collective conveyor belt to a subsequent stacking conveyor belt. Each time before the stop ridge is tilted upwards in one collective conveyor belt, the hose sections are rerouted to another collective conveyor belt where they form a parcel by running up against the stop ridge of this belt until a parcel of the desired size has been obtained, at which time, the feeding of the first collective conveyor belt is resumed.

In practice, it has been found, however, that the known devices for automatic formation and stacking of the hose section parcels do no longer function satisfactorily in modern high-capacity hose drawing machines, that is, hose drawing machines having an operating speed of approximately 150 m./min. and more. On the one hand, there is no longer a neat slowing down of the hose sections at a stop, especially in the case of hose sections with several staggered layers, because the hose sections hit the stop at too great an impact which may result both in bending the protruding edge of the hose section and in rebounding of the hose section. On the other hand, it is possible that individual hose sections do not even reach the stop ridge with their protruding end, such as in starting or stopping the hose drawing machine, because the speed of the hose sections is not yet high enough or no longer high enough, or in cases of very considerable overlapping of the hose sections because strong friction forces between the various hose sections have to be overcome if the protruding end of each individual hose section is to reach the stop ridge. In each of these cases, that is, especially at a too high or too low transport speed of the hose sections, the result is an untidy parcel formation which must, however, be avoided at all costs in view of the perfect further processing of the hose sections, especially in fully automatic bag production.

In order to render fully automatic bag production possible where the possibility of forming untidy parcels is excluded or reduced to a minimum, the present invention proposes the following in order to avoid the listed disadvantages in a device for automatic formation and stacking of loose parcels composed of hose sections made by a hose drawing machine, in which the hose sections are fed alternately, upon reaching a certain number, to one of two collective conveyor belts, are combined to loose parcels by way of a stop ridge, and are transferred to a stacking station when the respective stop ridge is tilted upwards: An intermediate conveyor belt, operating at a constant speed, is installed in front of the two collective conveyor belts. Its speed is independent of the respective material transport speed of the hose drawing machine and is less than the ordinary material transport speed of the hose drawing machine, preferably half the speed of the latter. During the operation of the hose drawing machine at the operating speeds normally applied nowadays, this intermediate conveyor belt functions as deceleration belt which prevents that the hose sections hit the stop ridge at the full material transport speed of the hose drawing machine. Rebounding, on the one hand, and bending of the protruding edge of the hose section, on the other hand, due to the impact of collision against the stop ridge being too great are thereby avoided. On the other hand, the intermediate conveyor belt functions as an acceleration belt during starting and stopping of the hose drawing machine because of its speed which is constant and independent of the respective speed of the hose drawing machine, and ensures transportation of the protruding end of the various hose sections up to the stop ridge even under the operating conditions described. Furthermore, by selecting a suitable speed of the intermediate conveyor belt, one can make sure that the overlapping of the various hose sections on this belt never becomes so great as to prevent all hose sections from reaching the stop ridge due to the forces of friction.

By developing the invention further, several height-adjustable guides may be mounted above each intermediate conveyor belt. Several guides may also be installed above each collective conveyor belt in front of the stop ridge. These guides rest on the top hose section.

A particularly advantageous development of the invention consists in placing behind each collective conveyor belt (in the direction of transportation) a stacking stage with stop ridge at the rear end which is actually known and is strongly inclined towards the rear when it is in the transfer position. Contrary to the known devices with stacking tables, however, it is not the individual hose sections, which may be superimposed on one another in scale-type fashion, which are fed to these stacking stages, but rather the parcels which have already been formed on the collective conveyor belts and which have been transferred to the appropriate stacking stage after the respective stop ridge has been tilted upwards. If, during the formation of the respective parcel in front of the stop ridge, there should still be slight irregularities in spite of the invented intermediate conveyor belt, these will be corrected, according to the proposal just mentioned, when the parcel is transferred from the collective conveyor belt to the stacking stage, because the parcel is once more loosened up when it changes its transport direction from an approximately horizontal plane to an inclined plane, and then hits the stop ridge of the stacking stage. This corresponds to an equalization of a parcel by hand which the operator had to do previously in hose drawing machines with manual parcel removal, in order to obtain the desired exact parcel form.

According to the invention, each stacking station may comprise two stacking stages which can be moved alternately behind the transfer end of the collective conveyor belt and can be tilted, one independently of the other, from the inclined take-over position to the transfer position. During the formation of a parcel at the stop ridge, the stacking stage carrying the preceding parcel of the respective collective conveyor belt is moved to the stacking position where it transfers the parcel to a transport device whereas the free stacking stage is moved behind the take-over end of the collective conveyor belt. It is particularly convenient if the stacking stages consist of one frame each and two table top halves which are swivel-mounted at the frame and can be folded downwards in the transfer position of the stage. By folding downwards the table top halves, the respective parcel is made to drop vertically to the conveyance, whereby the maintenance of the exact parcel form during this transfer is ensured. If a stack consisting of several hose section parcels is formed on the conveyance, before it is moved further, the stacking stages can be adjusted in height independently of one another during the movement from the take-over to the transfer position, in order so that they can be arranged at the proper height above the top hose section of the already existing stack when a hose section parcel is transferred. The height adjustment of the stacking stages is effected automatically, preferably by way of a photoelectrically controlled adjusting device.

The invention is explained in more detail in the description and the diagram which are found below. An example of one model is found in the diagram. In the diagram, FIG. 1 presents a lateral view of the invented device, arranged at the end of a hose drawing machine, and FIG. 2 presents a top view of the device as per FIG. 1.

The actual hose drawing machine is not presented in the diagram. The finished hose sections are sent alternately to an upper and a lower transport path 1 or 2, respectively, by a switch, which is not shown either and which is actuated when a certain number of hose sections have been transported past it. The upper transport path 1 is formed by an upper and a lower circulating belt system 3, 4, and the lower transport path 2 by an upper and a lower circulating belt system 5, 6.

In the preferred model of the invention which is shown in the diagram, a deceleration belt 7 or 8 follows each transport path 1, 2. The speed of the deceleration belts is much lower than the speed of the belt systems 3–6 so that the hose sections 9, which are ejected individually from the belt systems 3–6 are stacked on the deceleration belts in scale-type fashion. The speed of the deceleration belts 7, 8 is appropriately selected at half the speed of the belt systems 3–6. A number of guide rods 10 is arranged above each deceleration belt. Their free ends can be adjusted in height and are used for ensuring perfect scale formation on the deceleration belts.

The deceleration belt 7 is followed by a collective conveyor belt 11, and the deceleration belt 8 by a collective conveyor belt 12. A stop ridge 13 or 14, respectively, is mounted above each collective conveyor belt at a distance from the take-over end of the collective conveyor belts which is slightly greater than the longest hose section to be manufactured. The speed of the deceleration belts 7, 8 is sufficiently high for sending the hose sections 9 individually against the stop ridges so that loose hose section parcels 15 are formed on the collective conveyor belts. The collective conveyor belts 11, 12 can operate continuously at low speed or can be stopped during the formation of the parcel. A number of guide rods 16, which are mounted at a support rod 17, is arranged in front of the stop ridges 13, 14 above each collective conveyor belt. The supporting rods 17 are swivel-mounted in parts of the machine rack in a manner not illustrated. The free ends of the guide rods 16 rest loosely on the collective conveyor belt or the top hose section of a parcel being formed.

When the desired number of hose sections 9 has been fed to, for example, the lower transport path 2, the switch is automatically switched over so that the hose sections are then fed to the upper transport path 1. When a hose section parcel has been formed in front of the stop ridges 13, 14, the ridges are tilted up in the direction of movement, as has been indicated for ridge 13 by dotted lines. If the collective conveyor belts are driven continuously, the hose section parcel is transported further after the stop ridges have been tilted up. If, however, the collective conveyor belts are stopped during the formation of the parcel, the drive for the collective conveyor belts is switched on after the stop ridges have been tilted up.

Each collective conveyor belt 11, 12 is followed by a stacking station 18 or 19. Each stacking station is equipped with a pair of stacking stages 20, 21 which can be adjusted in height independently of one another and are swivel-mounted in a supporting structure. The two trunnions 22 for the two stacking stages of a stacking station are located in a vertical cross section plane so that the two stacking stages are located parallel to one another. The supporting structures of the stacking stations can be pivoted by a vertical axis 23 each. The stacking stations 18, 19 are coordinated to the collective conveyor belts 11, 12 in such a manner that one stacking stage of each stacking station is located in front of the take-over end of the respective collective conveyor belt 11 when the stacking stages 20, 21 are located in parallel to the collective conveyor belts. In the take-over position, the stacking stages are tilted backwards in the known fashion.

Due to the invented development of the device, the transfer of the hose sections to the stacking stages is carried out in parcels. In the diagram, the transfer of a hose section parcel 15 from the collective conveyor belt 11 to the stacking stage 20 or the stacking station 18 is illustrated. In order to avoid that the parcel 15 falls apart during the change of transport direction from an almost horizontal plane to an inclined plane, at least one press-on roll 24 is coordinated to each collective conveyor belt 11, 12 at the transfer end. As can be seen from FIG. 1, parcel 15 is loosened up once more during the change in the transport direction, and then runs up against a stop ridge 25 at the lower end of the stacking stage 20 which is in an inclined position. This process corresponds to equalization by hand, as has been done previously by the operators in order to correct any remaining slight irregularities of a parcel.

When a hose section parcel has been transferred to a stacking stage, the stage is tilted to a horizontal position, and the supporting structure is pivoted by 180° around the vertical axis 23. As a rule, a height adjustment of the stacking stage, supporting the parcel, to the correct stacking height is necessary before the supporting structure is pivoted, if the various hose section parcels are not removed immediately but are comprised to a stack under the stacking stage located in the stacking position, in order to be removed as a stack. In the diagram, the stacking stages 21 are drawn in their transfer position. Each stacking stage consists, for example, of a frame 26 and two table top halves 27, 28 which are swivel-mounted at the frame and are folded down whereupon the parcel located on the stacking stage drops downwards. When the supporting structure is pivoted by 180°, one stacking stage which has just passed on its hose section parcel is moved again behind the transfer end of the collective conveyor belt. After the table top halves have been folded up again, the stacking stage is moved to the receiving position by adjusting to the correct height position and by pivoting. The individual movements can be carried out simultaneously as far as possible. In FIG. 2, the best pivoting direction of the supporting structure with the stacking stages is indicated by the arrows 29.

In the selected design example, pallets 31–34 are provided for taking over the hose section parcels 15 from the stacking stages 20, 21. The pallets are equipped with wheels which are guided by rails 35. In the area of the stacking stations, the rails are located parallel to the collective conveyor belts and may lead directly to the feeders of bottom placing machines which process the hose sections further. In the selected design example, the pallets in the stacking station 19 are initially loaded only to half the stack height. In the stacking station 18, the pallets are then fully loaded. Whereas pallet 33 is loaded in the stacking station 19 and pallet 31 in the stacking station 18, pallet 32, which is half loaded, is located in a preparatory position prior to passing to the stacking station 18, and the empty pallet 34 is in a preparatory position prior to passing to the stacking position 19. It is, however, also possible to form a complete stack on a pallet in each stacking station 18, 19.

Instead of pallets, it is also possible to use a conveyor belt for transferring the hose section parcels. The parcels can then be stacked on this belt. Finally, there is the possibility of using magazines in which the hose section parcels are stacked and which are transferred to the feeding stations of bottom placing machines.

Since immediate further processing of the hose sections is often not possible or not convenient, there is the possibility of sending the pallets or magazines to temporary storage areas from where they are transported to the bottom placing machines as required.

The entire device is controlled by a counting device which controls, at the same time, the switch in front of the transport paths 1, 2. The movements of the stop ridges 13, 14 and of the stacking stages 20, 21 are released by the switch via an electric sequence control. The movement of the pallets can be released automatically when the desired stack height has been reached.

I claim:

1. An apparatus for automatically forming and depositing loose batches of tube sections produced by a tube forming machine comprising at least two first belt conveyors adapted to receive said tube sections alternately, a second belt conveyor following each said first belt conveyor and running at a lesser speed than the normal feeding speed of said first belt conveyor, a third belt conveyor following each said second belt conveyor, a first stop plate operatively associated with each said third belt conveyor for assembling said tube sections in loose batches on said third conveyor, and at least one depositing table inclined downwardly away from the delivery end of each said third belt conveyor for receiving said batches of tube sections thereon, a second stop plate being provided at the forward end of each of said depositing tables for neatly assembling said batches thereon into a stack.

2. An apparatus according to claim 1 further comprising at least one roller arranged above each said third belt conveyor at the delivery end thereof for pressing each loose batch thereagainst.

3. An apparatus according to claim 1 further comprising guide means arranged above each said second belt conveyor and being adjustable in height.

4. An apparatus according to claim 1 further comprising guide means arranged above each said third belt conveyor in front of said first stop plate for resting on the top tube section of a batch being there assembled.

5. An apparatus according to claim 1 wherein two depositing tables are arranged at the delivery end of each said third belt conveyor alternately movable in line with said third belt conveyor and independently pivotable from an inclined position to a horizontal position.

References Cited

UNITED STATES PATENTS

| | | | |
|---|---|---|---|
| 2,852,256 | 9/1958 | Faulls et al. | 271—76 |
| 2,977,002 | 3/1961 | Asp | 214—6 |
| 3,191,927 | 6/1965 | Hartbance et al. | 214—6 |
| 3,205,794 | 9/1965 | Califano et al. | 214—6 |
| 3,218,897 | 11/1965 | Geigenmiller et al. | 271—76 |

ROBERT G. SHERIDAN, *Primary Examiner.*

R. J. SPAR, *Assistant Examiner.*